(12) United States Patent
Hotra et al.

(10) Patent No.: US 10,409,632 B2
(45) Date of Patent: Sep. 10, 2019

(54) EMULATION OF HARDWARE COMPONENTS BASED ON INTERRUPT DESIGN

(71) Applicant: The Boeing Company, Chicago, IL (US)

(72) Inventors: Jonathan Nicholas Hotra, Maryland Heights, MO (US); Jason W. Shelton, Edgewood, WA (US)

(73) Assignee: THE BOEING COMPANY, Chicago, IL (US)

( * ) Notice: Subject to any disclaimer, the term of this patent is extended or adjusted under 35 U.S.C. 154(b) by 75 days.

(21) Appl. No.: 15/476,025

(22) Filed: Mar. 31, 2017

(65) Prior Publication Data

US 2018/0285134 A1    Oct. 4, 2018

(51) Int. Cl.
| | |
|---|---|
| *G06F 9/455* | (2018.01) |
| *G06F 9/48* | (2006.01) |
| *G06F 12/06* | (2006.01) |
| *G06F 13/10* | (2006.01) |
| *G06F 11/26* | (2006.01) |

(52) U.S. Cl.
CPC ......... *G06F 9/45558* (2013.01); *G06F 9/455* (2013.01); *G06F 9/4812* (2013.01); *G06F 12/063* (2013.01); *G06F 11/261* (2013.01); *G06F 13/105* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,597,951 B2 | 10/2009 | Bjormander et al. | |
| 2005/0216920 A1 | 9/2005 | Tewari et al. | |
| 2006/0004554 A1* | 1/2006 | Vega | G06F 9/45558 |
| | | | 703/6 |

(Continued)

OTHER PUBLICATIONS

Ben-Yehuda et al., "Utilizing IOMMUs for Virtualization in Linux and Xen," Dec. 31, 2006, retrieved from the Internet: URL:http://citeseerx.ist.psu.edu/viewdock/download;jsessionid=C84925C1B30163B0BB6F8B3003A5F629?doi=10.1.1.183.6907&rep=rep1&type=pdf [retrieved on Jun. 14, 2018].

(Continued)

*Primary Examiner* — Meng Ai T An
*Assistant Examiner* — Zujia Xu
(74) *Attorney, Agent, or Firm* — MH2 Technology Law Group LLP

(57) ABSTRACT

Systems and methods consistent with this disclosure provide for high fidelity emulation of special-purpose hardware devices systems by virtual hardware. The systems and methods can emulate a physical hardware system in a virtual machine by performing operations including constructing the virtual machine from the physical hardware system. The operations can also include emulating hardware components of the physical hardware system in the virtual machine. The operations can further include emulating operation the physical hardware system using the virtual machine based on a memory map that reproduces memory locations used by the physical hardware system to exchange information. Additionally, the operations can include performing testing of the physical hardware system via operation of the virtual machine.

16 Claims, 7 Drawing Sheets

(56) References Cited

U.S. PATENT DOCUMENTS

| | | | |
|---|---|---|---|
| 2007/0198240 A1* | 8/2007 | Moriat | G06F 17/5027 |
| | | | 703/17 |
| 2008/0229150 A1* | 9/2008 | Foster | G06F 11/261 |
| | | | 714/33 |
| 2013/0155083 A1 | 6/2013 | McKenzie et al. | |
| 2013/0166271 A1* | 6/2013 | Danielsson | G06F 11/3664 |
| | | | 703/22 |
| 2016/0085572 A1* | 3/2016 | Hotra | G06F 9/45558 |
| | | | 718/1 |

OTHER PUBLICATIONS

Extended European Search Report dated Jun. 26, 2018 in corresponding European Application No. 18154652.4.
Steinmetz, Christof (EP Examiner), extended European Search Report dated Jan. 7, 2019 in related European Application No. 18174150.5.

* cited by examiner

EMULATION OF HARDWARE COMPONENTS BASED ON INTERRUPT DESIGN

FIELD

This disclosure relates to modeling and virtualization. In particular, the present disclosure provides for high fidelity emulation of special-purpose hardware devices systems by virtual hardware.

BACKGROUND

During engineering, development, and testing of complex systems and devices, physical hardware (H/W) can be a limited resource. As such, it may not be possible for developers (e.g., scientists, engineers, software developers, and testers) involved in the development of such systems to have access to the physical hardware until very late in the development of the systems and devices. For example, the developers may be required to share a very limited number of prototypes or preproduction units of physical hardware until full production begins. As such, the developers may not be able to work in parallel. Rather, development and testing of the product may be delayed as each developer waits for their respective opportunity to access one of the available units.

The limited availability of physical hardware can be addressed using a desktop test environment (DTE), which may be a generic computing device (e.g., a personal computer) on which software of the physical hardware is hosted using an approach that modifies an Application Program Interface (API) layer of the software. In such approach, the DTE may use the same application software source code as the corresponding hardware device. However, the application software source code is rehosted to run on a PC host and compiled as an executable of a personal computer (e.g., desktop computer). In order to allow the hardware target software to run on a host personal computer the infrastructure software (e.g. drivers and board support package (BSP)) is removed and the API is modified to accommodate virtual I/O at the API layer to communicate with other simulations or emulations on the personal computer. This infrastructure software must be removed to rehost the software because some DTEs do not attempt to emulate several components of the physical hardware. The absence of these and other components can result in poor fidelity.

In testing situations, any problems related the missing components are unlikely to be discovered until the software is running on the physical hardware. For example, during integrated system testing, the various components may not operate as expected, even though testing had been performed using the conventional DTE. As a result, the application software may be revised and re-tested, which adds to the time and cost of development. Additionally, in cybersecurity applications, the missing components represents attack vectors that cannot be tested in the conventional DTE. Furthermore, in situations where the software has been recompiled for rehosting on the DTE, the resulting assembly language does not match the assembly language used in the physical hardware, which provides another potential attack vector that cannot be tested using the DTE.

SUMMARY

The present disclosure provides for emulation of a physical hardware system in a virtual machine. Systems, methods, and computer-program products perform operations including constructing a virtual machine from the physical hardware system. The operations can also include emulating hardware components of the physical hardware system in the virtual machine. The operations can further include emulating operation of the physical hardware system using the virtual machine based on a memory map that reproduces memory locations used by the physical hardware system to exchange information. Additionally, the operations can include performing testing of the physical hardware system via operation of the virtual machine.

Additionally, implementations consistent with the present disclosure provide a virtualization system for emulating a physical hardware system. The virtualization system can include a processor, a data storage device, and program instructions stored on the data storage device. When executed by the processor the program instructions can control the virtualization system to perform operations including emulating operation of the physical hardware system using a virtual machine based on a memory map. The memory map can reproduce memory locations used by the physical hardware system to exchange information.

Further, implementations consistent with the present disclosure provide a virtualization system that can provide emulated components emulating hardware components to be tested. The virtualization system can also store memory locations of a physical hardware system corresponding to the hardware components. The virtualization system can further send information from the hardware components via the memory locations corresponding to the hardware components. Additionally, the virtualization system can receive information sent to the hardware components via the memory locations corresponding to the hardware components.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure.

It should be noted that some details of the figures have been simplified and are drawn to facilitate understanding of the present teachings, rather than to maintain strict structural accuracy, detail, and scale.

DETAILED DESCRIPTION

Systems and methods disclose herein are directed to providing high fidelity emulation of special-purpose hardware devices using virtual hardware. Implementations consistent with the present disclosure enable emulation of physical hardware using virtual hardware without the need to develop or modify APIs (as in, e.g., a DTE). Additionally, rehosting software (e.g., software binaries) of the physical hardware is avoided by generating virtual hardware that can read values written to memory locations that are substantially equivalent to those used by the physical hardware to obtain information from other resources in the system. Doing so allows for the software of the physical hardware to run in the virtual hardware with substantially no modification.

In implementations, systems and methods disclosed herein can be used to generate virtual hardware for use in developing and testing special-purpose hardware, such as avionics line replaceable units (LRUs), industrial control devices, and other special-purpose hardware devices. Further, implementations disclosed herein allow for data capture from the virtual hardware devices in a lab (e.g., how a component operates) and subsequent data capture of the same device type in any location (on the flight line, in the factory floor, etc.).

In accordance with aspects of the present disclosure, the virtual hardware substantially matches the physical hardware, which enables developers to work in parallel, and which allows for problems to be caught early in product development. Additionally, the virtual hardware can provide test points for test and analysis (e.g., cybersecurity analysis) that would be inaccessible in the physical hardware system. For example, the virtual hardware may allow a developer to access and monitor substantially all memory accesses, instructions executed, I/O activities, and register states of the emulated physical hardware. As a result, implementations of the systems and methods disclosed herein can substantially reduce the time and cost involved in developing and testing hardware systems.

Figure 1:
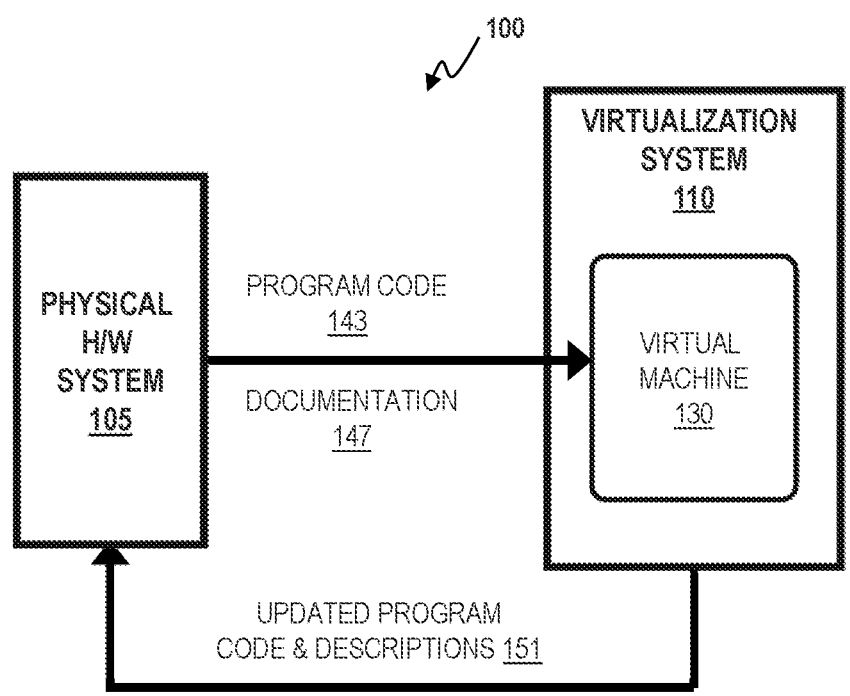
FIG. 1 shows a system block diagram illustrating an example of an environment for implementing systems and processes in accordance with aspects of the present disclosure.

FIG. 1 shows a block diagram illustrating an example of an environment 100 for implementing systems and processes in accordance with aspects of the present disclosure. Environment 100 can include a physical hardware system 105 and a virtualization system 110. The physical hardware system 105 can be comprised of one or more computer-implemented hardware components and one or more communication channels. For example, the physical hardware system 105 can be an avionics LRU, such a mission computer, a navigation unit, a communication unit, an engine management unit, a crew interface unit, a threat detection unit, electronic countermeasures unit, stores management unit, and the like. Additionally, for example, the physical hardware system 105 can be an integrated avionics unit comprised of one or more modules incorporating the functionality of some or all of the above avionics units.

While FIG. 1 is described above as an existing physical hardware system 105, it is understood that the physical hardware system 105 can be a new system that is under development and, therefore, not yet fully implemented or produced. In implementations, the physical hardware system 105 can be a pre-prototype unit comprised of partially implemented in software and/or hardware. For example, the physical hardware system 105 can be software executed by a temporary computing device (e.g., a breadboard system, a test bed system, and/or commercial-off-the-shelf system).

The virtualization system 110 can be a computing system comprised of hardware and software that can emulate other devices. In implementations, the virtualization system 110 can be one or more general purpose computers, such as a server or a desktop computer (e.g., a DTE) that hosts one or more virtual machines 130 that emulate physical hardware systems, such as the physical hardware system 105, as well as their hardware and software interfaces (e.g., peripherals, data links, interrupt behavior, and timing requirements). Additionally, the virtual machine 130 execute an exact or substantially exact copy (e.g., an image) of the application software executed by the physical hardware system 105. In implementations, the virtualization system 110 can include, e.g., a hypervisor or virtual machine monitor software. For example, the virtualization system 110 can use QUICK EMULATOR ("QEMU"), which is an open source software application that performs hardware virtualization.

The virtual machine 130 can be an emulation of the physical hardware system 105 within the virtualization system 110. Information for creating the virtual machine 130 can be obtained from the physical hardware system 105 and from program code 143 and documentation 147 describing the physical hardware system 105. For example, the program code 143 can be the application code for the physical hardware system 105 (e.g., an avionics LRU). The program code 143 can also include the source code (e.g., operating system), interface code (e.g., timing and formatting), and/or interrupt logic of hardware components and the communication links included in the physical hardware system 105. The documentation 147 can be information defining operational requirements and operating details of the hardware components and the communication links of the physical hardware system 105. For example, the documentation 147 can be technical specifications and infrastructure software.

The virtual machine 130 can be used for engineering, development and testing of the physical hardware system 105 before, during, and after its production. For example, prior to actual production of physical hardware, the virtual machine can be used to develop and debug pre-production software expected to be implemented in the physical hardware system 105. As such, development and testing of the hardware and software can occur in parallel. Additionally, during development of the physical hardware system 105 when few, if any, physical hardware units are available, developers can work with the virtual machine 130. Because the virtual machine 130 substantially matches the physical hardware system 105, each developer involved in the development and production of the physical hardware system 105 can implement a copy of the virtual machine 130 at their respective workstations (e.g., a respective virtualization system 110). The high-fidelity emulation provided by the virtual machine 130 allows for problems to be caught early and will provide considerable cost savings during development. Updated program code and/or descriptions 151 implemented in the virtual machine 130 can be fed back into the physical hardware system 105 to increase the rate of development. Further, after the physical hardware system 105 is fielded, the virtual machine 130 can be used to support, test, and update the physical hardware system 105. For example, in an aircraft accident investigation, the particular build of software used in the aircraft can be imaged (e.g., as program code 143) and executed in the virtual machine 130 using the virtualization system 110.

Figure 2:
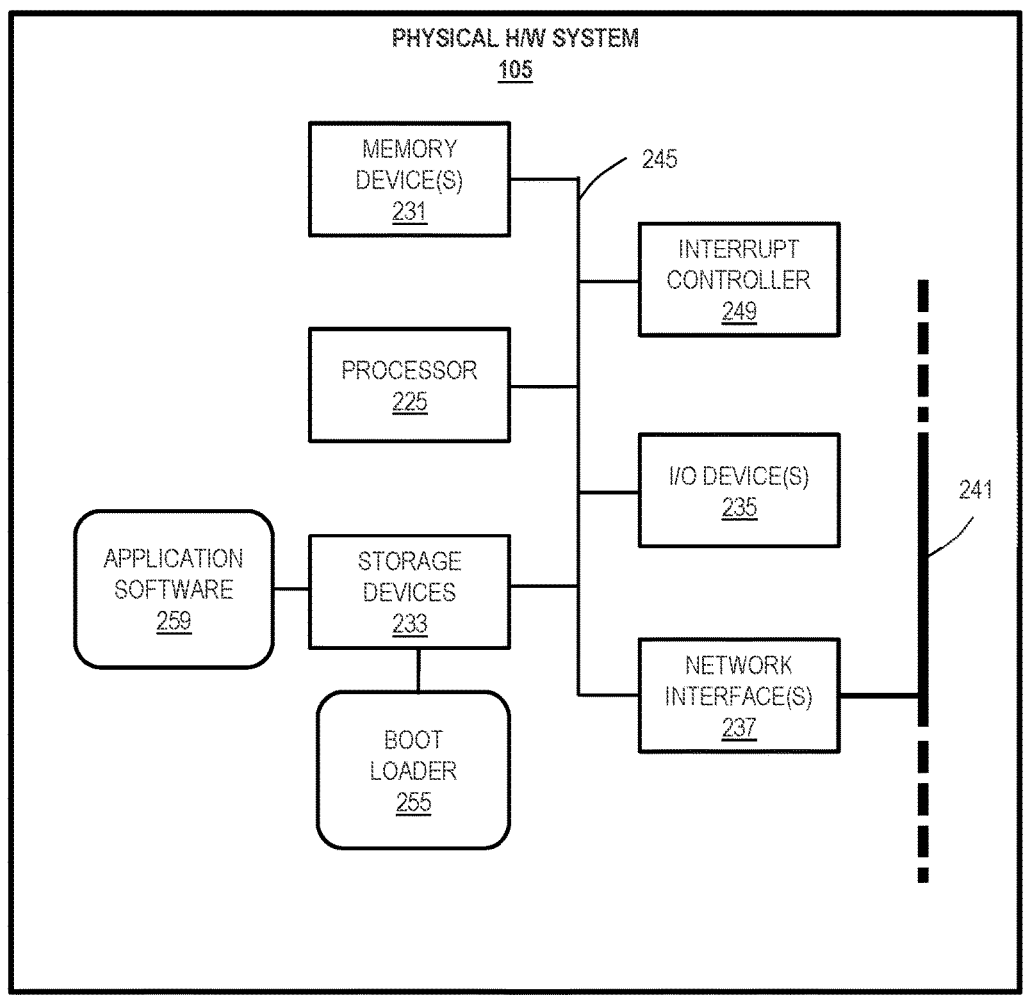
FIG. 2 shows a system block diagram illustrating an example of a physical hardware system in accordance with aspects of the present disclosure.

FIG. 2 shows a system block diagram illustrating an example of a physical hardware system 105 in accordance with aspects of the present disclosure. The physical hardware system 105 can be the same or similar to that previously described. The physical hardware system 105 includes hardware and software that may be emulated by virtual hardware (e.g., virtual machine 130) using a virtualization system (e.g., virtualization system 110) in accordance with aspects of the present disclosure.

The physical hardware system 105 can comprise any type of computing system including a general and/or specific purpose hardware capable of executing computer program instructions installed thereon (e.g., a personal computer, server, application-specific computing device, etc.). It is understood that the physical hardware system 105 is only representative of various possible equivalent-computing devices. To this extent, in embodiments, the functionality provided by the physical hardware system 105 can be any combination of general and/or specific purpose hardware and/or computer program instructions used for a variety of applications (e.g., industrial control and/or automation). In implementations, the physical hardware system 105 can be special-purpose device, such as an avionics LRU.

The physical hardware system 105 can be comprised of various components, including one or more processors 225, one or more memory devices 231, one or more storage devices 233, one or more input/output (I/O) devices 235, and one or more network interface devices 237. The processors 225 can include a microprocessor, a microchip, and/or an application-specific integrated circuit. The memory devices 231 can include one or more of a local storage, such as random access memory (RAM) and a cache memory, employed during execution of program instructions. The storage devices 233 can comprise a computer-readable, non-volatile hardware devices that stores information and program instructions. For example, the storage system 233 can be one or more flash drives, non-volatile memory and/or hard disk drives. The I/O devices 235 can include any device that enables an individual to interact with the physical hardware system 105 (e.g., a user interface) and/or any device that enables the physical hardware system 105 to communicate with one or more other computing devices using any type of communications link. The I/O device 235 can be, for example, a touchscreen display, pointer device, keyboard, etc. The network interface devices 237 can include any transceiver device configured to send and receive data via a network communication link, such as systems communication bus 241.

Additionally, the physical hardware system 105 can include one or more communication channels 245 (e.g., a data bus) through which the processors 225, memory devices 231, storage devices 233, input/output (I/O) devices 235, and network interface devices 237 can communicate. Further, the physical hardware system 105 can include an interrupt controller 249 which can be a programmable device used to manage communications of the processors 225, the memory devices 231, the storage devices 233, the input/output (I/O) devices 235, and/or the network interface devices 237 on to the communication channel 245, including allowing priority levels to be assigned to its interrupts.

The processor 225 executes computer program instructions (e.g., an operating system and/or application programs), which can be stored in the memory device 231 and/or storage devices 233. For example, the processor 225 can execute program instructions of a boot loader 255 and application software 259. The boot loader 255 can comprise program instructions that initiate operation of the physical hardware system 105 by loading its operating system. The application software 259 can application-specific program instructions (e.g., avionics software).

Figure 3:
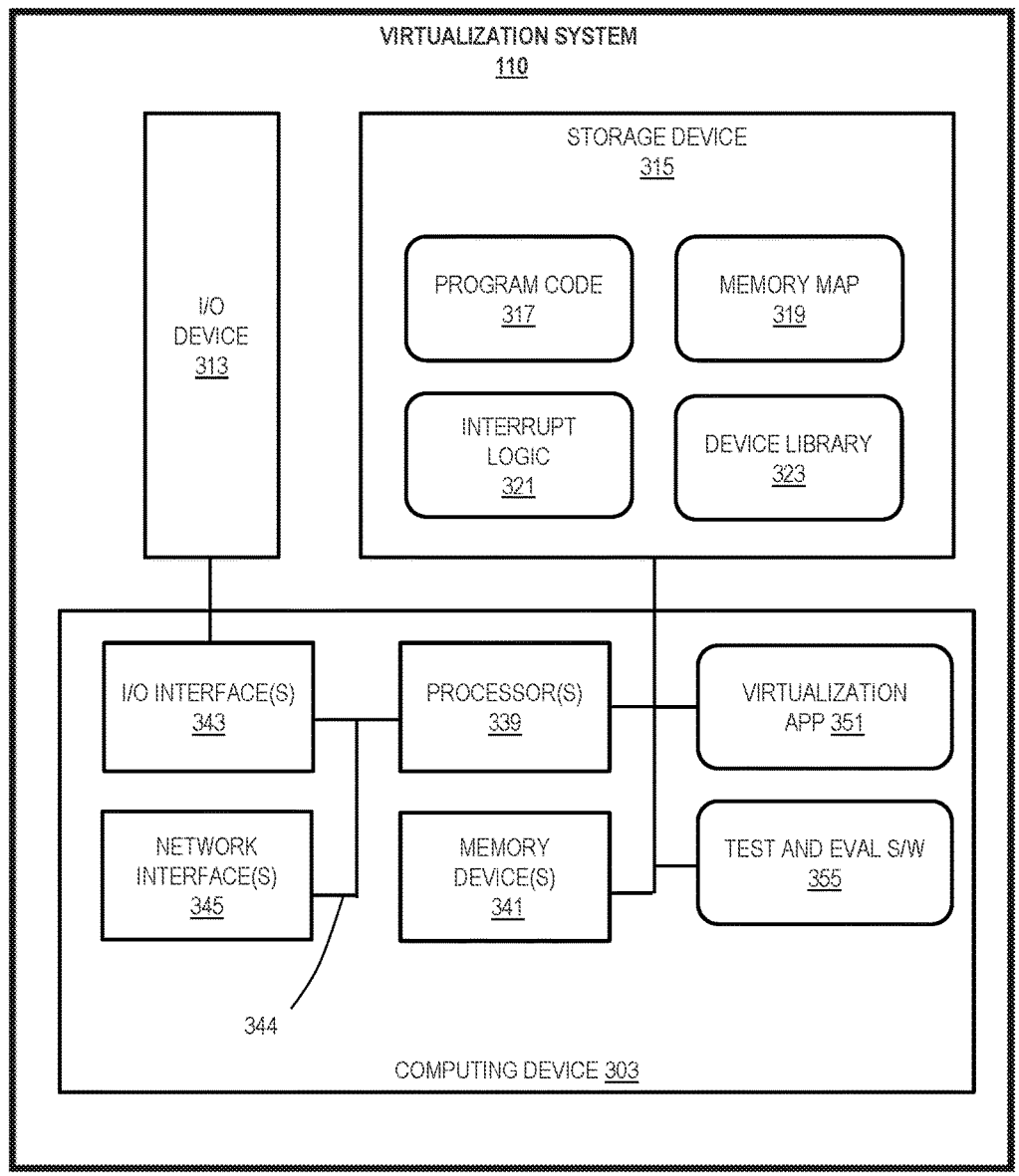
FIG. 3 shows a system block diagram illustrating an example of a virtualization system in accordance with aspects of the present disclosure.

FIG. 3 shows a system block diagram illustrating an example of a virtualization system 110, which can be the same or similar to that described above (e.g., virtualization system 110). The virtualization system 110 includes hardware and software that perform the processes and functions disclosed herein. The virtualization system 110 can comprise any type of computing system including a combination of general and/or specific purpose hardware capable of executing computer program instructions installed thereon.

The virtualization system 110 includes a computing device 303, an input/output (I/O) device 313, and a storage device 315. The I/O device 313 can include any device that enables an individual to interact with the computing device 303 (e.g., a user interface) and/or any device that enables the computing device 303 to communicate with one or more other computing devices using any type of communications link. The I/O device 313 can be, for example, a touchscreen display, pointer device, keyboard, etc.

The storage device 315 can comprise a computer-readable, non-volatile hardware storage device that stores information and program instructions. For example, the storage device 315 can be one or more flash drives and/or hard disk drives. In accordance with aspects of the present disclosure, the storage device 315 can store hardware system program code (e.g. program code 143), one or more memory maps of the hardware system 319, interrupt logic 321, and a device library 323. The program code 317 can be application software of a physical hardware system (e.g., physical hardware system 105). In implementations, the program code substantially mirrors that of the physical hardware system. The memory map 319 describes connections between components of the physical hardware systems from a memory interface perspective. In implementations, the memory map 319 comprises information defining locations of memory blocks of the hardware components in the memory 231 of the hardware system 105. For example, the memory map 319 can represent locations of information for memory registers of hardware components of the physical hardware system as an offset from a starting memory address. The interrupt logic 321 can be information describing the interrupt functionality of the physical hardware system, as detailed below. The device library 323 can be a repository of computer-readable information and instructions describing emulations of one or more physical hardware systems (e.g., physical hardware system 105), which may have been previously been created and stored for future use.

In embodiments, the computing device 303 includes one or more processors 339 (e.g., microprocessor, microchip, or application-specific integrated circuit), one or more memory devices 341 (e.g., RAM, read-only memory (ROM)), one or more I/O interfaces 343, and one or more network interface devices 345. The memory devices 341 can include a local memory (e.g., a random access memory and a cache memory) employed during execution of program instructions. Additionally, the computing device 303 includes at least one communication channel 344 (e.g., a data bus) by which it communicates with the I/O device 313 and the storage device 315. The processor 339 executes computer program instructions (e.g., an operating system and/or application programs), which can be stored in the memory device 341 and/or storage device 315.

The processor 339 can also execute computer program instructions of a virtualization application 351 (e.g., QEMU) and test and/or evaluation software 355. The virtualization application 351 can be the same or similar to that previously described. For example, the virtualization application 351 can include a hypervisor or virtual machine monitor software. In accordance with aspects of the present disclosure, the virtualization application 351 can provide a virtual machine (e.g., virtual machine 130) using the program code 317, the memory map 319, the interrupt logic 321, and/or the device library 323.

The test and evaluation software 355 can be an application or program including computer-readable instructions and information configured to test, evaluate, and/or validate software. For example, test and evaluation software 355 can execute test routines that verify program code of a hardware device behaves as expected in response to a predetermined scenario. Additionally, the test and evaluation software 355 can execute cybersecurity routines that test attack vectors of malicious software. For example, the test and evaluation software 355 can record complete state (registers, memory, hardware states, etc.) of a virtual machine as instructions execute to allow observation and analysis of a compromised system.

It is noted that the computing device 303 is representative of various possible equivalent-computing devices that can perform the processes described herein. To this extent, in embodiments, the functionality provided by the computing device 303 can be any combination of general and/or specific purpose hardware and/or computer program instructions. In the disclosed embodiments, the program instructions and hardware can be created using standard programming and engineering techniques, respectively.

Figure 4:
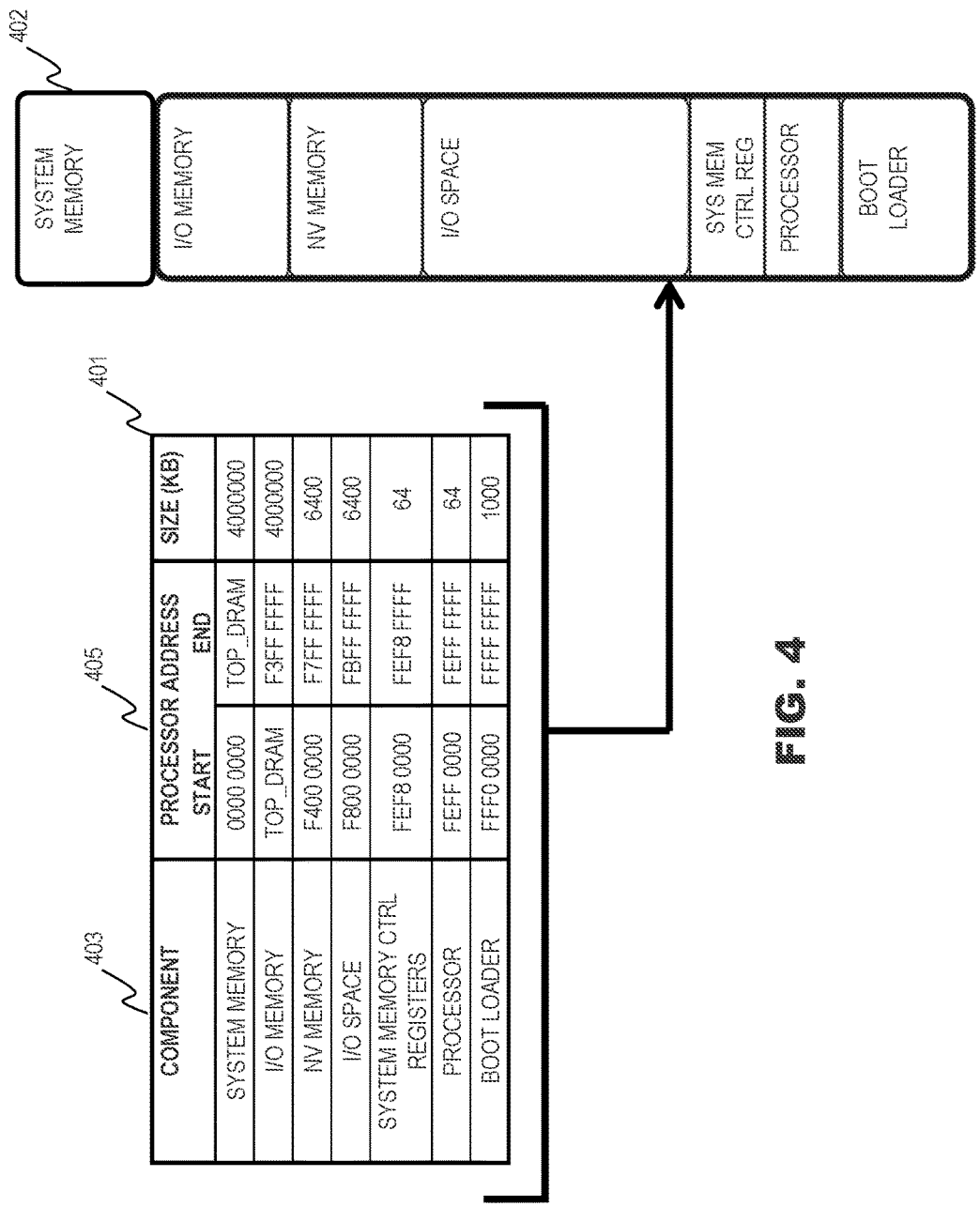
FIG. 4 shows an example of a memory map in accordance an embodiment of the present disclosure.

FIG. 4 illustrates an example of a memory map 401 and an address space 402 of a virtualization system in accordance with implementations of the present disclosure. The memory map 401 associates hardware components 403 of a physical hardware system (e.g., physical hardware system 105) and memory locations 405 (e.g., memory blocks of memory device 231) of the virtualization system (e.g., virtualization system 110). The information comprising the memory map 401 can be exacted from documentation (e.g., documentation 147) of the physical hardware system. The address space 402 for the virtualization machine (e.g., virtualization machine 130) can be memory construct generated based on the memory map 401. For example, the address space 402 can include register memory addresses and ranges corresponding to locations of the emulated components (e.g., components of physical hardware system 105) within the virtualization system. In implementations, there may be three kinds of memory typically found in a memory map: volatile (e.g., RAM), non-volatile (e.g. flash), and memory mapped I/O. The volatile memory can be used, for example, to retrieve and store information during software execution. The non-volatile memory can be used, for example, to store software instructions for execution and configuration information. The memory mapped I/O can be used to exchange information between hardware components, which can illicit behaviors and responses of the hardware components.

Figure 5:
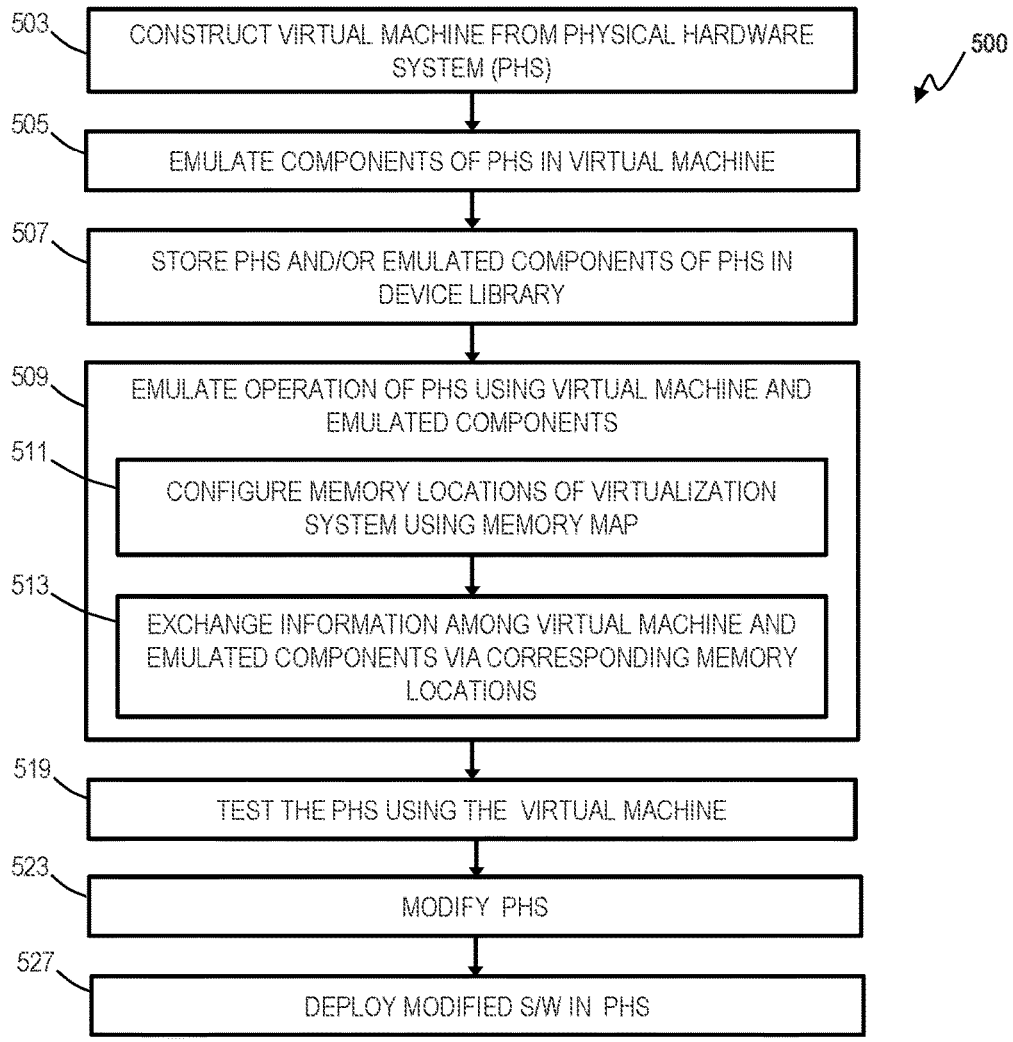
FIG. 5 shows a process flow diagram illustrating virtual machine construction and product development utilization operations performed in accordance with aspects of the present disclosure.
Figure 6:
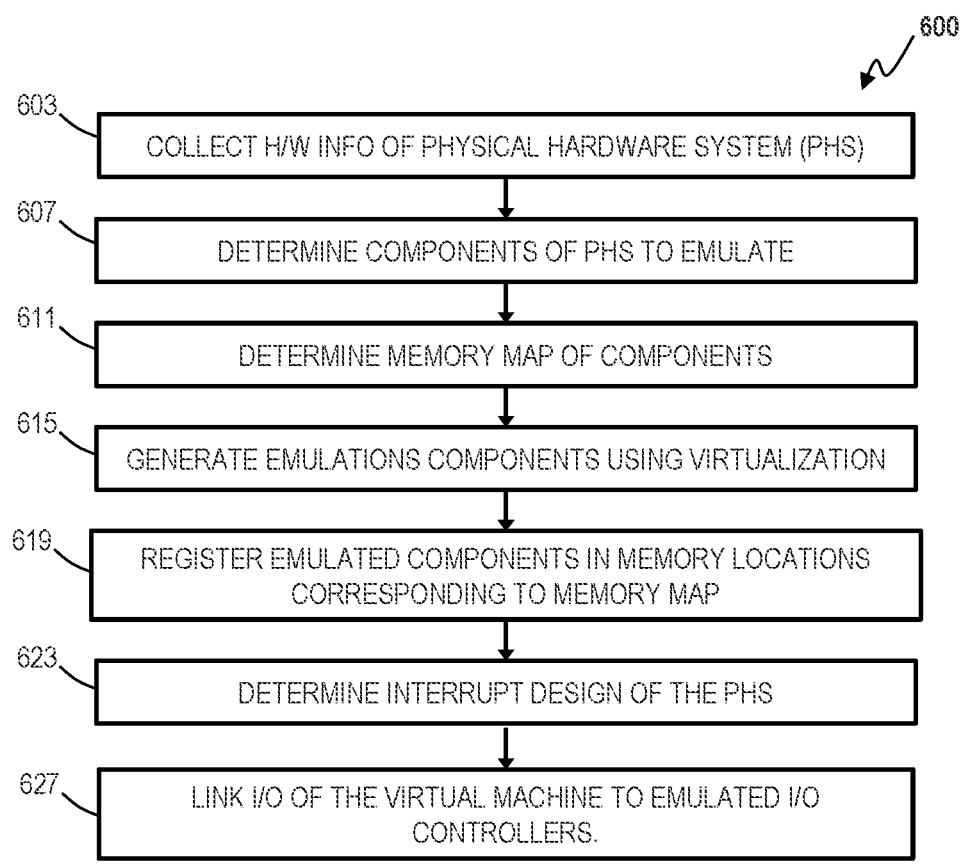
FIG. 6 shows a process flow diagram illustrating virtual machine construction operations performed in accordance with virtual machine construction aspects of the present disclosure.
Figure 7:
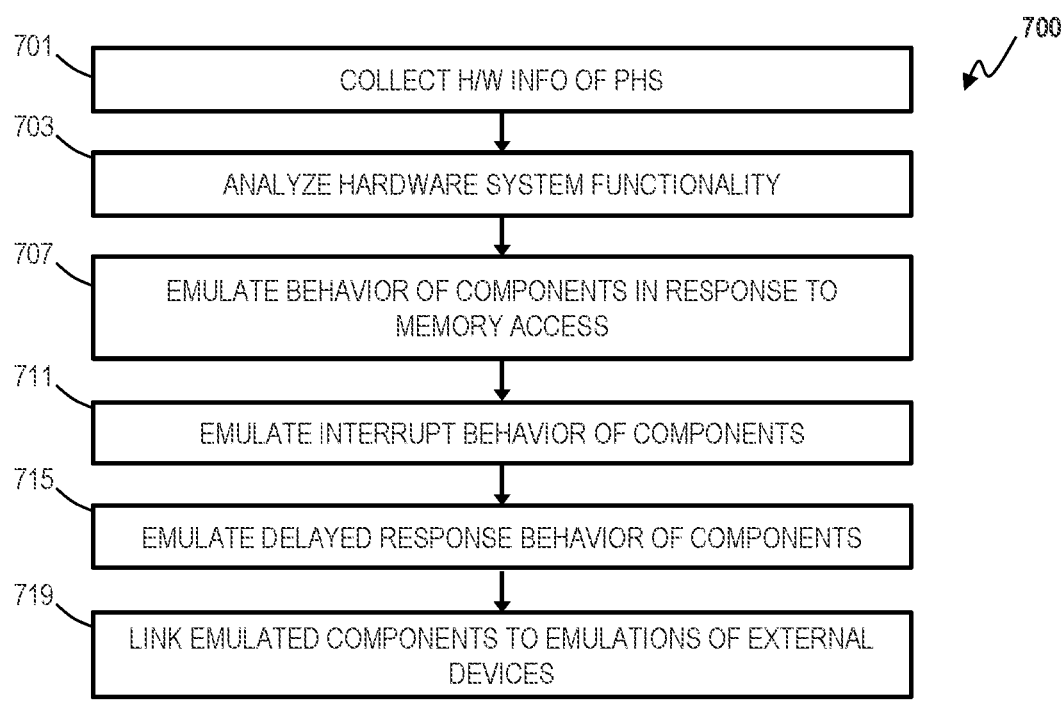
FIG. 7 shows a process flow diagram including operations performed in accordance with virtual machine construction with connection to systems outside the virtual machine aspects of the present disclosure.

The flow diagrams in FIGS. 5-7 illustrate examples of the functionality and operation of possible implementations of systems, methods, and computer program products according to various implementations consistent with the present disclosure. Each block in the flow diagrams of FIGS. 5-7 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 5-7. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 5 illustrates a process flow diagram of an exemplary process 500 including operations performed in accordance an embodiment of the present disclosure. At 503, a virtual machine (e.g., virtual machine 130) is constructed from a physical hardware system (e.g., physical hardware system 105) using a virtualization system (e.g., computing device 303 executing virtualization software (virtualization application 351). For example, a user (e.g., developer) can execute program code (e.g., program code 143) from the physical hardware system on the virtualization system 110. At 505, the hardware components are emulated in the virtual machine constructed at 503, as detailed below with regard to FIG. 7. At 507, the virtual machine constructed at 503 and/or the hardware components emulated at 505 can be stored (in, e.g., device library 323) for future reference and use in other implementations (e.g., other virtual machines including one or more of the hardware components).

At 509, the virtualization system emulates the operation of the physical hardware system using the virtual machine constructed at 503 and the hardware components emulated at 505. The emulating can include, at 511, configuring the address space of a virtualization machine (e.g., virtualization machine 130) using a memory map (e.g., memory map 401) to match the address space of the physical hardware system and/or the emulated hardware components. The emulating of 509 can also include, at 513, exchanging information among the virtual machine and/or the emulated hardware components via registering memory locations configured at 511 using the memory map. For example, the memory addresses and ranges for memory registers of the physical hardware system and hardware components can be registered with the virtual machine, and used to implement the functionality of each memory register found for the virtual machine and the emulated hardware components. By doing so, the virtual machine and the emulated hardware components can communicate via the memory constructs of the virtualization machine by reading and writing information in the same manner as the hardware components of the physical hardware system. This provides a level of fidelity to the virtualization system that is greater than that which can achieved by communicating via an API modified for software rehosted on a DTE.

At 519, the virtualization system performs testing (e.g., test and evaluation) of the physical hardware system and/or the hardware components via operation of the virtual machine. The test and evaluation can include software debugging, operational testing, integration testing, cybersecurity testing, and so on. At 523, the developer can modify at least one of the software and/or hardware of the physical hardware system based on the test and evaluation performed at 519. At 527, the developer can deploy the modifications of 523 the physical hardware system. For example, modified software can be deployed to fielded production units of the physical hardware system. Additionally, modifications to hardware and/or software can be fed back into the design of simulations, pre-production units, or prototypes of the physical hardware.

FIG. 6 illustrates a process flow diagram of an exemplary process 600 for constructing a virtual machine in accordance an embodiment of the present disclosure. At 603, a developer collects information regarding a physical hardware system to be emulated (e.g., physical hardware system 105). The information collected at 603 can include specifications of hardware components and functional descriptions describing the configuration of memory registers, hardware block diagrams, system architecture of the physical hardware system, memory maps, interrupt connections, board support packages, and the like. Additionally, the developer can collect information regarding the software of the physical hardware system. In some implementations, collecting the software information includes decompiling or disassembling code stored on the physical hardware system.

At 607, the developer determines components of the physical hardware system to emulate based on the information collected at 603. In implementations, the developer identifies hardware components of the physical hardware system that are not visible on the system memory map and thus are not directly accessible to software and are not necessarily required for emulation. For example, cache memory or a bridge that is not visible via a memory map of the physical hardware system (e.g., memory map 401) may not be emulated.

At 611, the developer determines the memory map of the components determined at 607 using the information collected at 603, in a same or similar manner to that described previously herein (e.g., FIG. 4). The memory map indicates the components of the physical hardware system and their corresponding locations in the memory of the physical hardware system. Analyzing the memory map can include identifying memory devices and/or storage devices of the physical hardware system, hardware devices of the physical hardware system (e.g., I/O controllers, timers, bridges, interrupt controllers, block devices, control registers, etc.)

At 615, the developer generates emulations of the components determined at 607 using virtualization software (e.g., virtualization application 351). At 619, the developer registers the emulated components generated at 615 in the memory of the virtualization system based on the memory map determined at 611. For example, the developer can apportion a region (e.g., memory space 405) to the virtual machine (e.g., virtual machine 130) representing the physical hardware system, and assign the emulated components to blocks (e.g., in address space 402) within the region, as previously described herein with regard to FIG. 4.

At 623, the developer determines the interrupt design of the physical hardware system using the information collected at 603. For example, the developer identifies hardware components that use interrupts and determines interrupt connections between hardware components and the interrupt controller. Additionally, hardware schematics showing wiring between I/O controllers and interrupt controller can be used to establish interrupt connectivity for the virtual machine by tracing interrupt lines traced in a schematic to other hardware components. Alternatively, the software in a board support package or device driver for the hardware system 105 can be used to determine interrupt connectivity. Doing so allows identification of interrupts for different components of the physical hardware device. At 627, the developer can link the I/O of the components emulated at 615 to emulated I/O controllers. As an example, Ethernet controllers in the virtual machine can be connected to virtual network interface cards (NIC) (e.g., TAP Devices, etc.).

FIG. 7 illustrates a process flow diagram of an exemplary process 700 for emulating a physical hardware device in accordance an embodiment of the present disclosure. At 701, a developer collects information regarding a physical hardware system to be emulated (e.g., physical hardware system 105). The information can be the same or similar to that previously described herein (e.g., FIG. 6, 603). At 703, the developer analyzes hardware device functionality based on the information collected at 701. For example, the developer can analyze documentation (e.g., documentation 147) and identify hardware registers, interrupt functionality, delayed responses (e.g., using virtual machine virtual timers), and external virtual machine connectivity (virtual NICs, virtual ARINC 429, etc.).

At 707, the developer emulates, in the virtual machine, behaviors of the hardware components in response to memory accesses. At, 711, the developer emulates, in the virtual machine, interrupt behaviors of the hardware components. And, at 715, behaviors of delayed responses of hardware components can also be emulated. For example, memory access to a hardware component register may cause a device register to be modified to cause a specified behavior or an interrupt can be signaled to a hardware component to cause an activity to occur. In some cases of transmission by an Ethernet controller, a packet for transmission over Ethernet may be queued for transmission by writing it to a memory location. Doing so may trigger an interrupt to the Ethernet Controller by the system software to cause the Ethernet packet to be sent from the virtual machine. In the some cases of an Ethernet reception, the packet will arrive at the virtual machine from an external device, e.g. a virtual NIC, this packet will be stored in an internal queue and then in some instances this packet will be transferred to system RAM using a DMA engine to transfer the Ethernet packet from the Ethernet Controller internal memory to system RAM, after the transfer is complete an interrupt will be signaled from the Ethernet Controller to let the system software know that an Ethernet packet has arrived and is available in system memory. For example, the delayed responses may emulate a given baud rate on an interface by varying the speed of serial data. At 719, the developer links the virtual machine to one or more emulated devices external to the physical hardware system. For example, a link may be created between external I/O of the emulated devices and an emulation of a network device with which the hardware components may communicate with in the physical hardware system.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for emulating a physical hardware system in a virtual machine of a virtualization system, wherein the physical hardware system having one or more of hardware components and an interrupt controller, the method perform using the virtualization system, comprising the steps of:
   constructing the virtual machine from the physical hardware system, by determining an interrupt design of the physical hardware system, including:
      identifying the one or more of the hardware components that are emulated that use interrupts;
      storing information of the one or more of the hardware components that are emulated in memory locations of the virtualization system based on a memory map; and
      determining interrupt connections between the one or more hardware components and the interrupt controller;
   emulating the one or more of the hardware components of the physical hardware system in the virtual machine;
   emulating operation of the physical hardware system using the virtual machine based on the memory map that reproduces memory locations used by the physical hardware system to exchange information among the one or more hardware components that are emulated;
   performing testing of the physical hardware system via operation of the virtual machine; and
   modifying the physical hardware system based on the testing.

2. The method of claim 1, further comprising:
   deploying modification of the physical hardware system.

3. The method of claim 2, wherein emulating operation of the physical hardware system further comprises configuring the memory locations of the virtualization system using the memory map.

4. The method of claim 3, wherein the exchanging information among the one or more hardware components that are emulated is via memory constructs of the virtual machine.

5. The method of claim 1, wherein constructing the virtual machine from the physical hardware system comprises:
   determining the memory map based on a configuration of a memory of the physical hardware system.

6. The method of claim 1, wherein emulating the one or more hardware components of the physical hardware system comprises emulating, in the virtual machine, behaviors of the one or more hardware components in response to memory accesses.

7. The method of claim 1, wherein emulating the one or more hardware components of the physical hardware system comprises emulating, in the virtual machine, interrupt behaviors of the one or more hardware components.

8. The method of claim 1, further comprising linking, in the virtual machine, inputs and outputs of the one or more hardware components to one or more systems that are emulated external to the virtual machine.

9. The method of claim 1, wherein the physical hardware system is an avionics unit.

10. A virtualization system for emulating a physical hardware system in a virtual machine constructed inside the virtualization system, wherein the physical hardware system having one or more of hardware components and an interrupt controller, the virtualization system comprising:

a processor, a data storage device, and program instructions stored on the data storage device that, when executed by the processor, control the virtualization system to perform operations comprising:

constructing the virtual machine from the physical hardware system, by determining an interrupt design of the physical hardware system, including:
identifying the one or more of the hardware components that are emulated that use interrupts;
storing information of the one or more of the hardware components that are emulated in memory locations of the virtualization system based on a memory map; and
determining interrupt connections between the one or more hardware components and the interrupt controller;

emulating the one or more of the hardware components of the physical hardware system in the virtual machine;

emulating operation of the physical hardware system using the virtual machine based on the memory map that reproduces memory locations used by the physical hardware system to exchange information among the one or more hardware components that are emulated;

performing testing of the physical hardware system via operation of the virtual machine; and modifying the physical hardware system based on the testing.

11. The virtualization system of claim 10, wherein the operations further comprise:
modifying software of the physical hardware system based on the testing; and deploying the modified software in the physical hardware system.

12. The virtualization system of claim 10, wherein emulating operation of the physical hardware system comprises configuring the memory locations of the virtualization system using the memory map.

13. The virtualization system of claim 10, wherein the exchanging information among emulated components of the physical hardware system is via the memory locations of the virtualization system.

14. The virtualization system of claim 10, wherein the memory map defines locations of memory blocks of the physical hardware system in memory constructs of the virtual machine.

15. The virtualization system of claim 10, wherein the virtualization system stores emulated components of the physical hardware system in a memory of the virtualization system based on the memory map.

16. The virtualization system of claim 10, wherein the operations further comprise emulating behaviors of the physical hardware system in response to memory accesses.

* * * * *